United States Patent
Jin et al.

(10) Patent No.: US 10,048,578 B2
(45) Date of Patent: Aug. 14, 2018

(54) METHOD OF IDENTIFYING REPEATING DESIGN CELLS

(71) Applicant: SHANGHAI HUAHONG GRACE SEMICONDUCTOR MANUFACTURING CORPORATION, Shanghai (CN)

(72) Inventors: Xiaoliang Jin, Shanghai (CN); Zheng Zhong, Shanghai (CN); Chunyu Yuan, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 173 days.

(21) Appl. No.: 14/979,127

(22) Filed: Dec. 22, 2015

(65) Prior Publication Data

US 2016/0192205 A1    Jun. 30, 2016

(30) Foreign Application Priority Data

Dec. 25, 2014    (CN) .......................... 2014 1 0838338

(51) Int. Cl.

| | |
|---|---|
| *G03F 1/36* | (2012.01) |
| *G06F 17/50* | (2006.01) |
| *G03F 7/20* | (2006.01) |
| *G03F 1/00* | (2012.01) |

(52) U.S. Cl.
CPC ............ *G03F 1/36* (2013.01); *G06F 17/5068* (2013.01); *G03F 1/144* (2013.01); *G03F 7/705* (2013.01); *G06F 17/5045* (2013.01); *G06F 17/5072* (2013.01); *G06F 17/5081* (2013.01); *G06F 2217/12* (2013.01)

(58) Field of Classification Search
CPC .... G03F 1/36; G06F 17/5068; G06F 17/5072; G06F 17/5045; G06F 17/5081; G06F 2217/12
See application file for complete search history.

(56) References Cited

U.S. PATENT DOCUMENTS

| 5,253,182 A | * | 10/1993 | Suzuki | ............... | G06F 17/5068 |
|---|---|---|---|---|---|
| | | | | | 250/492.1 |
| 5,619,419 A | * | 4/1997 | D'Haeseleer | ....... | G06F 17/5072 |
| | | | | | 716/123 |
| 5,638,293 A | * | 6/1997 | Scepanovic | ......... | G06F 17/5072 |
| | | | | | 716/123 |
| 6,009,250 A | * | 12/1999 | Ho | ...................... | G06F 17/5081 |
| | | | | | 716/52 |

(Continued)

*Primary Examiner* — Helen Rossoshek
(74) *Attorney, Agent, or Firm* — Muncy, Geissler, Olds & Lowe, P.C.

(57) ABSTRACT

A method of identifying repeating design cells in a layout is disclosed. The method includes: providing a layout including a plurality of first leaf cells and a plurality of second leaf cells; identifying a plurality of groups each consisting of overlapping first and second leaf cells; for each of the groups, selecting a first or second leaf cell as an observational cell and establishing a coordinate system originated at a single reference position of the observational cell, thereby obtaining a plurality of coordinates of the overlapping first and second cells; for each of the groups, sorting the coordinates and generating a hash; and identifying ones of the groups having identical hashes as repeating design cells.

11 Claims, 4 Drawing Sheets

(56) References Cited

U.S. PATENT DOCUMENTS

| | | | | |
|---|---|---|---|---|
| 6,011,911 A * | 1/2000 | Ho | ............... | G06F 17/5081 |
| | | | | 716/112 |
| 6,088,708 A * | 7/2000 | Burch | ............... | G06F 17/211 |
| | | | | 715/229 |
| 6,370,673 B1 * | 4/2002 | Hill | ............... | G06F 17/5072 |
| | | | | 716/123 |
| 6,519,749 B1 * | 2/2003 | Chao | ............... | G06F 17/5072 |
| | | | | 716/123 |
| 6,543,039 B1 * | 4/2003 | Watanabe | ............... | G06F 17/5068 |
| | | | | 716/124 |
| 6,898,780 B2 * | 5/2005 | Egorov | ............... | G03F 1/36 |
| | | | | 716/134 |
| 6,924,071 B1 * | 8/2005 | Buck | ............... | G03F 1/36 |
| | | | | 430/22 |
| 7,877,722 B2 * | 1/2011 | Duffy | ............... | G03F 7/7065 |
| | | | | 716/55 |
| 7,984,395 B2 * | 7/2011 | Cork | ............... | G03F 1/36 |
| | | | | 716/53 |
| 8,280,632 B2 * | 10/2012 | Sakamoto | ............... | B82Y 10/00 |
| | | | | 250/492.3 |
| 8,365,130 B2 * | 1/2013 | Mikuni | ............... | G06F 17/5077 |
| | | | | 716/126 |
| 8,472,695 B2 * | 6/2013 | Nikaido | ............... | G01R 31/318511 |
| | | | | 382/144 |
| 8,595,666 B2 * | 11/2013 | Hayakawa | ............... | G01N 21/8851 |
| | | | | 716/112 |
| 8,775,998 B2 * | 7/2014 | Morimoto | ............... | G06F 17/5045 |
| | | | | 257/528 |
| 2002/0006695 A1 * | 1/2002 | Hatsch | ............... | G06F 17/5045 |
| | | | | 438/200 |
| 2015/0339434 A1 * | 11/2015 | Nifong | ............... | G06F 17/5072 |
| | | | | 716/112 |

* cited by examiner

US 10,048,578 B2

METHOD OF IDENTIFYING REPEATING DESIGN CELLS

CROSS-REFERENCES TO RELATED APPLICATIONS

This application claims the priority of Chinese patent application number 201410838338.4, filed on Dec. 25, 2014, the entire contents of which are incorporated herein by reference.

TECHNICAL FIELD

The present invention pertains to the field of semiconductor technology and, more particularly, relates to a method of differentiating among repeating design cells.

BACKGROUND ART

Integrated circuit (IC) fabrication is a very complex process involving photolithography as one of the most complex techniques, which is an important driving force to promote the development of IC technology and directly determines performance of the resulting chips.

A typical photolithography process involves embodying the design of a circuit layout being manufactured in a mask and then transferring the circuit layout on a silicon substrate after the circuit layout has been enlarged by a photolithography tool. During this process, however, due to the nature of light and limitations of the actually used projection exposure system, serious energy loss may be caused by limited diffraction or non-linear filtering of the imaging system. That is, optical proximity effect (OPE) occurs, which will inevitably produce distortions during the enlargement and transfer of the circuit layout. Such distortions, particularly for processes of 180-micron node or beyond, may have such a great impact as to lead to failure of the whole process. In order to prevent this from happening, optical proximity correction (OPC) methods are used in this art to perform pre-correction on the circuit layout to compensate for the OPE-caused errors.

However, there are still a number of limitations associated with these OPC processes. For example, as shown in FIG. 1, in a mask including six first cells $a_1$, $a_2$, $a_3$, $a_4$, $a_5$, $a_6$ and one second cell b, an overlap between the cells b and $a_4$ renders the cell $a_4$ different from the other cells $a_1$, $a_2$, $a_3$, $a_5$ and $a_6$. Further consideration on the effects of optical interference and diffraction reveals that there is also an overlap between the cell b and an interference-diffraction region $a_3$' of the cell $a_3$. That is, similar to the cell $a_4$, the cell $a_3$ is also different from the other cells. Therefore, in order for the correctness of an OPC process to be performed, differentiation among the cells $a_1$, $a_2$, $a_3$, $a_4$, $a_5$, $a_6$ is needed.

SUMMARY OF THE INVENTION

It is an objective of the present invention to provide a method of identifying repeating design cells in a layout, which is capable of accurately identifying the repeating design cells.

In accordance with the above objective, a method of identifying repeating design cells in a layout according to the present invention includes:

providing a layout including a plurality of first leaf cells and a plurality of second leaf cells;

identifying a plurality of groups each consisting of overlapping first and second leaf cells;

for each of the plurality of groups, selecting a first or second leaf cell as an observational cell and establishing a coordinate system originated at a reference position of the observational cell, thereby obtaining a plurality of coordinates of the overlapping first and second cells;

for each of the plurality of groups, sorting the plurality of coordinates of the overlapping first and second cells and generating a hash; and identifying ones of the plurality of groups having identical hashes as repeating design cells.

Optionally, identifying the plurality of groups each consisting of overlapping first and second leaf cells may include: creating a cell lookup table for the layout; performing spatial partitioning on the cell lookup table to identify locations of the first and second leaf cells; and determining whether there are overlapping first and second leaf cells.

Optionally, the method may further include forming an interference-diffraction region around each of the first and/or second leaf cells, prior to the determination step.

Optionally, the overlapping may include overlapping between first and second leaf cells and overlapping between first and/or second leaf cells and an interference-diffraction region.

Optionally, the spatial partitioning may be performed on the cell lookup table in a distributed parallel manner.

Optionally, the first and second leaf cells may be rectangular cells, wherein the coordinate system is originated at a vertex of the rectangular observational cell, thereby obtaining coordinates of four vertices of each of the first and second leaf cells.

Optionally, each of the coordinates may be represented as (x, y, ID, n), where x is an X-coordinate, y is a Y-coordinate, ID is identifier of the first or second leaf cell and n is the number of the vertex.

Optionally, the coordinates of overlapping first and second cells of each of the plurality of groups may be sorted based sequentially on magnitudes of X-coordinates and Y-coordinates thereof.

Optionally, the sorting of the coordinates of overlapping first and second leaf cells of each of the plurality of groups may be performed in a distributed parallel manner.

Optionally, the method may further include performing a single optical proximity correction process on the identified repeating design cells.

Optionally, the method may further include determining ones of the plurality of groups having different hashes as different design cells and subjecting the different design cells to separate optical proximity correction processes.

Optionally, the method may further include identifying from the layout separated first and/or second leaf cells that are not in contact with any other leaf cell, and performing a single optical proximity correction process on the separated first and/or second leaf cells.

In comparison with the prior art, the method according to the present invention includes: providing a layout including a plurality of first leaf cells and a plurality of second leaf cells; identifying a plurality of groups each consisting of overlapping first and second leaf cells; for each of the plurality of groups, selecting a first or second leaf cell as an observational cell and establishing a coordinate system originated at a reference position of the observational cell, thereby obtaining a plurality of coordinates of the overlapping first and second cells; for each of the plurality of groups, sorting the plurality of coordinates of the overlapping first and second cells and generating a hash; and identifying ones of the plurality of groups having identical hashes as repeating design cells. This enables accurate identification of repeating design cells and increased OPC performance. In addition, the distributed parallel processing can significantly accelerate the computation process and result in an efficiency increase.

DETAILED DESCRIPTION

Figure 1:
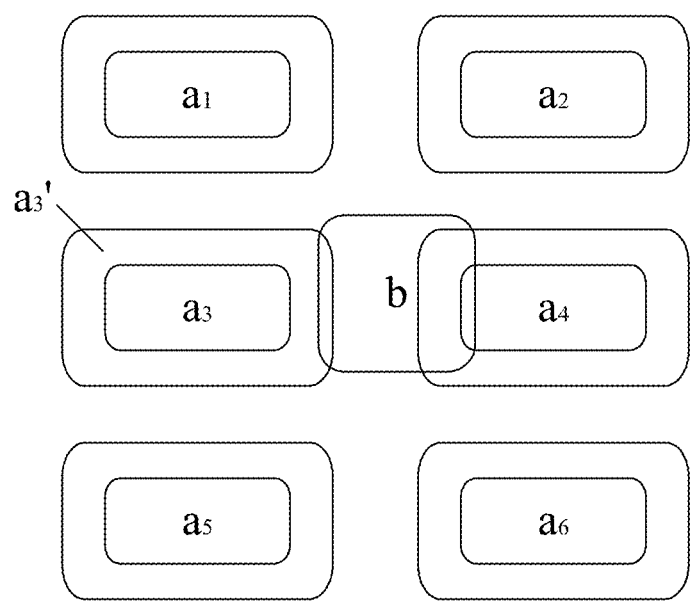
FIG. 1 shows several distribution patterns of repeating design cells in accordance with the prior art.

The method of identifying repeating design cells in a layout according to the present invention will be described in greater detail in the following description which presents preferred embodiments of the invention, in conjunction with the accompanying drawings. It is to be appreciated that those of skill in the art can make changes in the invention disclosed herein while still obtaining the beneficial results thereof. Therefore, the following description shall be construed as widely known by those skilled in the art rather than as limiting the invention.

For simplicity and clarity of illustration, not all features of the specific embodiments are described. Additionally, descriptions and details of well-known functions and structures are omitted to avoid unnecessarily obscuring the invention. The development of any specific embodiment of the present invention includes specific decisions made to achieve the developer's specific goals, such as compliance with system related and business related constraints, which will vary from one implementation to another. Moreover, such a development effort might be complex and time-consuming but would nevertheless be a routine undertaking for those of ordinary skill in the art.

The present invention will be further described in the following paragraphs by way of example with reference to the accompanying drawings. Features and advantages of the invention will be more apparent from the following detailed description, and from the appended claims. Note that the accompanying drawings are provided in a very simplified form not necessarily presented to scale, with the only intention of facilitating convenience and clarity in explaining a few exemplary embodiments of the invention.

The core idea of the present invention is to provide a method of identifying repeating design cells in a layout, the layout including patterns and reference cells, the reference cells including smaller cells, non-repeating cells and repeating cells, the method including:

a step S201 of creating a cell lookup table and obtaining leaf cells of repeating cells;

a step S202 of obtaining spatial configurations of the leaf cells, wherein the spatial configurations including overlaps;

a step S203 of, for each group of overlapping leaf cells, setting an observational cell, establishing a coordinate system originated at a reference point of the observational cell, thereby obtaining a list of coordinates of the overlapping leaf cells;

a step S204 of sorting the coordinates in the list and generating a hash; and a step S205 of determining whether groups of overlapping leaf cells are identical according to their hashes and thereby identifying the repeating design cells.

For purposes of more fully describing the invention, preferred embodiments of methods of differentiating among and testing repeating design cells are presented below. It should be understood that the invention is not limited to the disclosed embodiments and modifications made by those of ordinary skill in the art with conventional technical approaches are also within the scope of the invention.

Figure 2:
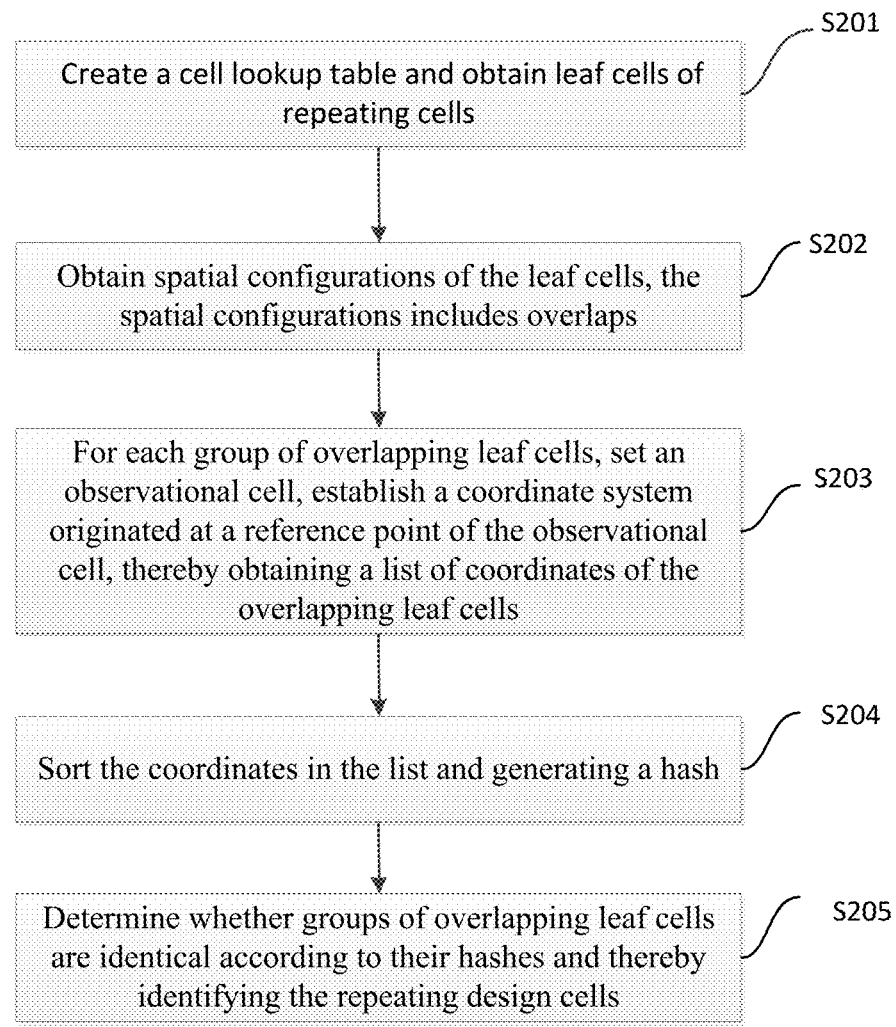
FIG. 2 is a flowchart graphically illustrating a method of identifying repeating design cells in accordance with an embodiment of the present invention.
Figure 3:
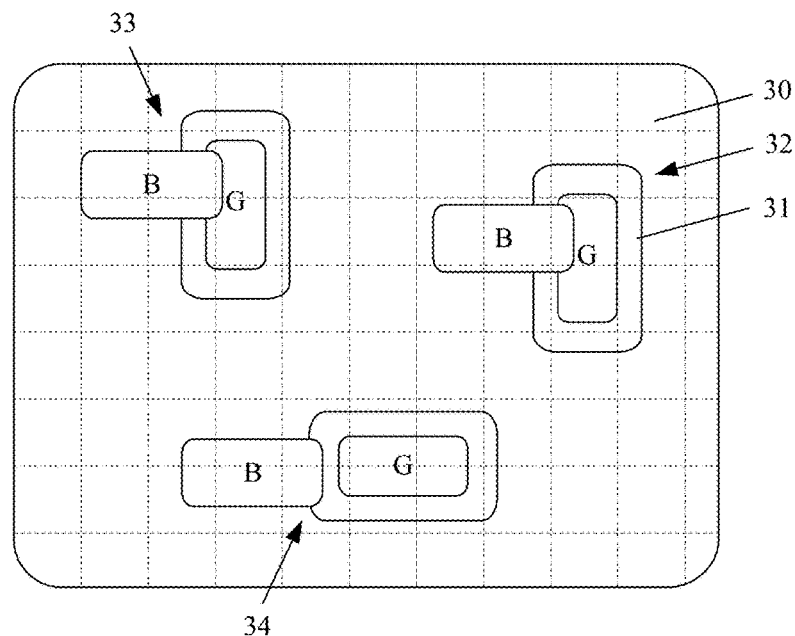
FIGS. 3 to 5 are diagrammatic illustrations of how repeating design cells are processed in accordance with an embodiment of the present invention.
Figure 4:
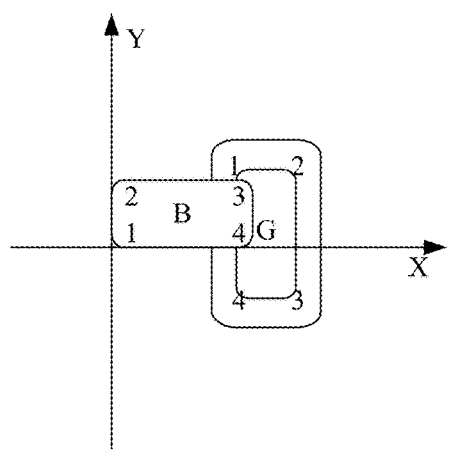
Figure 5:
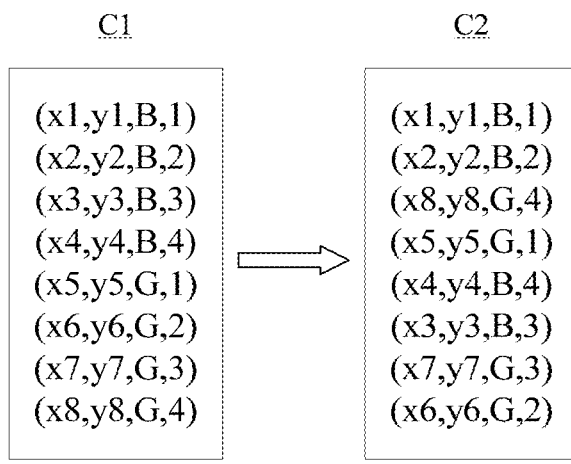

Referring to FIGS. 2 to 5, in which, FIG. 2 is a flowchart graphically illustrating a method of identifying repeating design cells in accordance with an embodiment of the present invention, and FIGS. 3 to 5 are diagrammatic illustrations of how repeating design cells are processed in accordance with an embodiment of the present invention.

As shown in FIG. 2, in this embodiment, the method includes the steps described as follows.

At first, step S201 is performed to create a cell lookup table with which leaf cells of repeating design cells are obtained. Specifically, according to the design of a desired mask, multiple repeating design cells incorporated therein may be organized into a hierarchy tree from which the leaf cells may be obtained. Referring to FIG. 3, in embodiments of the present invention, the obtained leaf cells include cells G and cells B.

Step 202 is then carried out to obtain spatial configurations of the leaf cells, wherein the spatial configurations include overlaps. With continuing reference to FIG. 3, a space lookup table may be first created with which spatial partitioning is conducted such that, for example, the layout 30 is meshed with horizontal and vertical dashed lines, thus allowing identification of locations of the cells B and cells G During this process, the effects of optical interference and diffraction may be additionally taken into account to, for example, determine interference-diffraction regions 31 around the respective cells G in the layout 30. In this way, the spatial configurations of the leaf cells can be obtained.

Thereafter, an analysis is conducted on the spatial configurations of the leaf cells. In general terms, the spatial configurations include overlaps and separated configurations. In this embodiment, as shown in FIG. 3, the three pairs each consist of one cell B overlapped with one cell G, in which, both of the first and second pairs 32 and 33 have two direct overlapping leaf cells and the pair 34 has a leaf cell overlapped with an interference-diffraction region 31. A leaf cell having a spatial configuration that is a separated configuration refers to a leaf cell that is not in contact with any other leaf cell and thus can be directly subjected to an OPC process. For multiple leaf cells each with a separated configuration, a single OPC process may be sufficient. In addition, by means of scanning the space lookup table, the leaf cells may be processed in a distributed parallel manner, which enables high CPU utilization and a significant efficiency increase and is thus particularly advantageous in applications employing a multi-core CPU with a clock speed that increases slowly.

Step S203 is then performed to define one of the cells in each pair as an observational cell and establish a coordinate system originated at a reference point of the observational cell to obtain a list of coordinates of the overlapping leaf cells. Here, the reference points of the respective observational cells are selected as points having the same relative positions in the observational cells. With the first overlapping leaf cell pair 32 as an example and with reference to FIG. 4, one of the cells B and G may be selected as an observational cell. In general terms, each of the leaf cells is a rectangle. It should be noted that the rectangles include rounded rectangles. For example, in this embodiment, the cell B may be selected as the observational cell, and a coordinate system is established originated at one of its vertices, such that coordinates of the four vertices of each of the leaf cells can be obtained.

Specifically, the vertex 1 may serve as the origin, with the two edges intersecting at the vertex acting as X and Y axes of the coordinate system, thereby obtaining coordinates of the vertices 1, 2, 3 and 4 of the cell B and coordinates of the vertices 1, 2, 3 and 4 of the cell G Preferably, according to the invention, the coordinates assume the form of (x, y, ID, n), where x is the X-coordinate, y is the Y-coordinate, ID is the identifier of the leaf cell and n is the number of the vertex. For example, the coordinates of vertex 1 of the cell B may be represented as (x1, y1, B, 1). It is a matter of course that any other coordinate system may be used as long as it is uniformly applicable to all leaf cells to facilitate the comparison operation as described below.

This step may also be conducted in a distributed parallel manner. That is, the three pairs of overlapping leaf cells shown in FIG. 3 are processed on separate processors.

Step S204 is subsequently carried out such that the coordinates in each list is sorted and a hash is created for it. Referring to FIG. 5, the list C1 is shown as a list consisting of the coordinates of the vertices of the cells B and G obtained based on the coordinate system of FIG. 4, and the list C2 is shown as a list obtained after the coordinates of list C1 are sorted. Preferably, the sorting is based sequentially on magnitudes of the X-coordinates and on magnitudes of the Y-coordinates. That is, the X-coordinates of the 8 coordinate groups are first compared such that the groups are arranged in a descending order. In addition, any set of groups with identical X-coordinates is further sorted in a descending order based on the magnitudes of their Y-coordinates. It is a matter of course that it is also possible to, for example, sort the list based first on magnitudes of the Y-coordinates and then on those of the X-coordinates. With the list C2 having been obtained, a hash is created for it.

Similarly, this step may also be conducted in a distributed parallel manner.

At last, step S205 is carried out to determine whether the pairs of overlapping leaf cells are identical according to their hashes and thereby differentiate among the repeating design cells. For example, in the embodiment shown in FIG. 3, comparisons among the three hashes demonstrate that the hash of the first overlapping leaf cell pair 32 is identical to that of the second overlapping leaf cell pair 33, and the two hashes are different from that of the third overlapping leaf cell pair 34. Accordingly, it can be determined that the repeating design cell corresponding to the first overlapping leaf cell pair 32 is identical to that of the second overlapping leaf cell pair 33, and the two repeating design cells are both different from the repeating design cell corresponding to the third overlapping leaf cell pair 34. Thereafter, different repeating design cells are subjected to separate OPC processes, and identical ones can be processed in the same single OPC process.

With the above-described process, accurate differentiation among repeating design cells is possible, which enables determining whether the repeating design cells are identical, thereby effectively enhancing the OPC performance.

It is apparent that those skilled in the art can make various modifications and variations without departing from the scope of the invention. Thus, it is intended that any of such modifications and variations falling within the scope of the appended claims or equivalent thereof is also embraced by the present invention.

What is claimed is:

1. A method of manufacturing a mask, comprising:
    providing a layout corresponding to a mask to be manufactured, the layout comprising a plurality of first leaf cells and a plurality of second leaf cells;
    identifying a plurality of groups each consisting of overlapping first and second leaf cells;
    for each of the plurality of groups, selecting a first or second leaf cell as an observational cell and establishing a coordinate system originated at a reference position of the observational cell, thereby obtaining a plurality of coordinates of the overlapping first and second cells;
    for each of the plurality of groups, sorting the plurality of coordinates of the overlapping first and second cells and generating a hash;
    identifying ones of the plurality of groups having identical hashes as identical repeating design cells;
    performing optical proximity correction processes on the layout to obtain a compensated layout; and
    manufacturing a mask according to the compensated layout,
    wherein performing optical proximity correction processes on the layout comprises performing a single optical proximity correction process on the identified identical repeating design cells.

2. The method of claim 1, wherein identifying the plurality of groups each consisting of overlapping first and second leaf cells comprises:
    creating a cell lookup table for the layout;
    performing spatial partitioning on the cell lookup table to identify locations of the first and second leaf cells; and
    determining whether there are overlapping first and second leaf cells.

3. The method of claim 2, further comprising forming an interference-diffraction region around each of the first and/or second leaf cells, prior to the determination step.

4. The method of claim 3, wherein the overlapping comprises overlapping between first and second leaf cells and overlapping between first and/or second leaf cells and an interference-diffraction region.

5. The method of claim 2, wherein the spatial partitioning is performed on the cell lookup table in a distributed parallel manner.

6. The method of claim 1, wherein the first and second leaf cells are rectangular cells, and wherein the coordinate system is originated at a vertex of the rectangular observational cell, thereby obtaining coordinates of four vertices of each of the overlapping first and second leaf cells.

7. The method of claim 6, wherein each of the coordinates is represented as (x, y, ID, n), where x is an X-coordinate, y is a Y-coordinate, ID is identifier of the first or second leaf cell and n is number of the vertex.

8. The method of claim 7, wherein the coordinates of overlapping first and second leaf cells of each of the plurality of groups are sorted based sequentially on magnitudes of X-coordinates and Y-coordinates thereof.

9. The method of claim 8, wherein the sorting of the coordinates of overlapping first and second leaf cells of each of the plurality of groups is performed in a distributed parallel manner.

10. The method of claim 1, further comprising determining ones of the plurality of groups having different hashes as different design cells, wherein performing optical proximity correction processes on the layout further comprises subjecting the different design cells to separate optical proximity correction processes.

11. The method of claim 1, further comprising identifying from the layout separated first and/or second leaf cells that are not in contact with any other leaf cell,
wherein performing optical proximity correction processes on the layout further comprises performing a single optical proximity correction process on the separated first and/or second leaf cells.

* * * * *